United States Patent [19]

Giuliano et al.

[11] Patent Number: 4,907,182
[45] Date of Patent: Mar. 6, 1990

[54] SYSTEM ENABLING HIGH-SPEED CONVOLUTION PROCESSING OF IMAGE DATA

[75] Inventors: Ercole Giuliano; Giorgio Musso, both of Genoa, Italy

[73] Assignee: Elettronica San Giorgio-Elsag S.p.A., Italy

[21] Appl. No.: 908,392

[22] Filed: Sep. 17, 1986

[30] Foreign Application Priority Data

Sep. 27, 1985 [IT] Italy ............................... 67826 A/85

[51] Int. Cl.$^4$ ......................................... G06F 15/336
[52] U.S. Cl. ............................................... 364/728.01
[58] Field of Search .................... 364/728, 736, 728.01, 364/724.12

[56] References Cited

U.S. PATENT DOCUMENTS

| | | | |
|---|---|---|---|
| 3,748,451 | 7/1973 | Ingwersen | 364/728 |
| 4,025,769 | 5/1977 | Simpson et al. | 364/728 |
| 4,489,393 | 12/1984 | Kawahara | 364/728 |
| 4,541,048 | 9/1985 | Propster et al. | 364/736 |
| 4,580,215 | 4/1986 | Morton | 364/200 |
| 4,627,026 | 12/1986 | Di Giugno | 364/736 |
| 4,694,416 | 9/1987 | Wheeler et al. | 364/736 |
| 4,698,751 | 10/1987 | Parvin | 364/200 |

OTHER PUBLICATIONS

Kung et al., "Hardware Pipelines for Multi-Dimensional Convolution and Resampling", *Computer Architecture for Pattern Analysis and Database Management*, Nov. 1981, pp. 273-278, IEEE Computer Society Press.

Blackmer et al., "A 200 MOPS Systolic Processor", *SPIE Conference Proc.*, vol. 298, Real-Time Signal Processing IV, Aug. 1981, pp. 1-9.

Kung, "Systolic Algorithms for the CMU Ways Processor", *Systolic Signal Processing Systems*, 1987, Marcel Decker, pp. 570-577.

Kung, "Why Systolic Architectures", *IEEE Computer*, vol. 15, #1, pp. 37-46, Jan. 1982.

*Primary Examiner*—Gary V. Harkcom
*Assistant Examiner*—Dale M. Shaw
*Attorney, Agent, or Firm*—Gifford, Groh, Sprinkle, Patmore and Anderson

[57] ABSTRACT

A system enabling high-speed convolution processing of image data, which system includes at least one arithmetical unit having a number of identical processing cells interconnected in semisystolic formation and designed to perform one- or two-dimensional convolutions with separable variables; and a memory block designed to store at least the aforementioned data to be subjected to such convolution processing.

14 Claims, 5 Drawing Sheets

SYSTEM ENABLING HIGH-SPEED CONVOLUTION PROCESSING OF IMAGE DATA

BACKGROUND OF THE INVENTION

The present invention relates to a system enabling high-speed convolution processing of image data, for any scientific, industrial, medical, space or military application. For such applications, two techniques are known for processing into images data received from external sensors (in particular, viewing devices, but also acoustic sensors, etc.): one whereby "scattered" data is processed into conventional images; and another whereby in-coming data is already in the form of an image of the outside world, and processing consists in extracting and analysing the data contained in the image itself.

In both cases, much of the image conversion technology involved is based on convolution algorithms which, despite their extremely useful mathematical properties, introduce such lengthy processing times as to render application on standard computers unpractical.

Particularly in industry, for example, robot viewing systems require extremely high image processing potential especially at the early stages for filtering space frequencies and improving contrast, or for detecting image characteristics required for further higher-level processing. The starting data, which is usually supplied by an electronic retina containing as many as 200,000 transducers or more, is scanned at MHz frequencies and must all be processed separately.

Of all algorithm-based methods, by far the most widely used are the digital techniques which obviously require discrete image conversion. The image itself may be defined as a two-dimensional sequence of brightness value terms, and may be thought of as being obtained by dividing a photograph (square for the sake of simplicity) into a mosaic of N.N squares (pixels) of equal size and each of which is assigned a grey level.

In the field in which the system according to the present invention is to be applied, filtering is of major importance, specially for "edge extraction", which is an essential function, particularly on processing systems required to distinguish objects from a given background and subsequently identify them.

A discreet image, in fact, supplies all the information acquired externally by an "artificial viewing system", which information, however, may only be put to practical use if converted into a more efficent form than a mere sequence of different pixel brightness levels. "Edge extraction", for example, is an image conversion process which preserves much of the structural image data, thus facilitating subsequent processing.

An "edge extraction" process output consists of a group of lines located at brightness variation points on the image. The effectiveness of such lines lies in their being closely related to the properties of the objects being viewed, in that, obviously, brightness variations are often located on the edges of the said objects.

A convolution is only one "edge extraction" operation; subsequent operations in the process depending on the type of sequence employed.

The following is a brief summary of what is already known of the said convolution process.

If X is a sequence representing an image, and $x(1,m)$ the generic term of the same sequence, wherein variables $1$ and $m$ (whole numbers between 0 and $N-1$) indicate the location (line or column) of the term in question, the sequence may obviously be considered a matrix of N lines and N columns, the elements of which are located according to the relative pixels from which they have been obtained.

In the case of a convolution, a starting sequence X produces a new sequence Y, each term of which is a weight sum of terms in the starting sequence situated about the term having the same location. Convolution processing therefore depends on the weight sequence, K, employed.

A convolution operation is indicated:

$$Y = K * X.$$

The generic term in the resulting sequence Y is:

$$y(1,m) = \sum_{s,t} k(s,t) \, x(1-s, m-t)$$

Convolution processing is usually interpreted as filtering space frequencies.

For reliable results to be obtained, even in the presence of noise, filtering matrixes for "edge extraction" must in many cases be of relatively large size. Increasing the size of the K sequence, however, obviously increases the number of processing operations involved. Calculating each term in a sequence resulting from a two-dimensional-sequence convolution (having the usual characteristics) involves:

(i) knowing $n_R.n_c$ terms in the sequence for processing;

(ii) multiplying each term by an appropriate "weight" (the number of products thus being equal to $n_R.n_c$);

(iii) adding together the resulting products (when adding pairs of numbers, the number of additions equals: (n° of products to be added)$-1 = (n_R.n_c) - 1 \simeq n_R.n_c$).

For application purposes, processing work must be simplified as far as possible, i.e. by reducing the number of operations required for each result.

When processing sequence K is separable, the whole process is considerably simpler. Separability for K means:

$$k(s,t) = f(s).g(t)$$

in which f(s) and g(t) are the terms of two one-dimensional sequences of $n_R$ and $n_c$ terms respectively.

If separability exists:

$$\begin{aligned}
y(1,m) &= \sum_{s,t} f(s) \cdot g(t) \cdot x(1-s, m-t) \\
&= \sum_{s} f(s) \cdot \left( \sum_{t} g(t) \cdot x(1-s, m-t) \right) \\
&= \sum_{s} f(s) \cdot w(1-s, m)
\end{aligned}$$

in which:

$$w(1,m) = \sum_{t} g(t) \cdot x(1, m-t)$$

The calculation may thus be broken down into two consecutive convolutions involving one two-dimensional and one one-dimensional processing sequence.

W is a two-dimensional sequence of intermediate values obtained from X by means of a first one-dimensional line convolution (so called because the $w(1,m)$ calculation involves only $x(1,m-i)$ values located on the same line). Starting from the said intermediate values, the final sequence Y is obtained by means of a second one-dimensional convolution, this time a column convolution (so called because it only involves values in the same column). A one-dimensional line (column) convolution may be considered a special convolution case with a two-dimensional processing sequence with $n_R=1(n_c=1)$. The following extension ma therefore be made:

$$g(j) \rightarrow g_R(0,j)$$

$$f(i) \rightarrow f_c(i,0)$$

(R or C indicates that the said two-dimensional sequences may only have terms other than zero along one line or column).

The separability condition already mentioned becomes a special case of:

$$K = F_c * G_R$$

For the entire calculation, therefore, the following equation may be employed:

$$Y = F_c*(G_R*X) = F_c*W \text{ with } W = G_R*X$$

The first one-dimensional convolution, whereby W is calculated from starting sequence X, requires $1.n_c$ operations per term (the term "operation" is generally intended to mean acquiring a value of the sequence to be processed, multiplying it by an appropriate term in the processing sequence, and adding the product). The second convolution, whereby sequence Y is obtained from sequence W, requires $n_R.1$ operations per term.

This means the final sequence is calculated with a total of $n_R+n_c$ operations per term, a considerable reduction as compared with direct processing, which would require $n_R.n_c$ operations. And the higher the $n_R$ and $n_c$ values are, the greater the reduction will be.

What is more, actual performance of the calculation is simplified by replacing a two-dimensional convolution with two separate one-dimensional convolutions, each having only $n_R$ or $n_c$ terms.

The amount of processing work involved is a common problem in the case of direct numerical processing of discreet image sequence terms, on account of the large number of such terms involved. For example, in the case of an image having 512.512 pixels and a separable two-dimensional processing sequence of 32.32 terms, the number of operations to be performed would be over $3.10^7$, half of which are multiplications.

During the early processing stages, the original image must very often be processed using convolution equipment of different sizes and/or functions, for evidencing characteristics of special interest. Employing such algorithms on a standard computer, processing time may easily be as high as a few tens of seconds to a few minutes, depending on how complex the processing operation is. This is obviously unacceptable, even for the algorithm-simulating stages, and even moreso under real operating conditions, which generally require very fast processing times measurable in so many milliseconds per video image being acquired.

For combining image conversion precision and high-speed processing, therefore, two-dimensional masks in industry are limited to those which may be separated with no noticeable practical limitations. A two-dimensional convolution is therefore calculated by multiplying two consecutive one-dimensional convolutions in two perpendicular image directions.

The effectiveness of a dedicated machine for convolution processing, which may be employed on a computer in the same way as a standard peripheral unit, is therefore obvious. On a specialized machine, in fact, appropriate structuring may be selected for significantly reducing total processing time.

SUMMARY OF THE INVENTION

The aim of the present invention is to provide a system enabling one- or two-dimensional convolution processing with separable variables, which system provides for high-speed processing, features a flexible, modular design enabling it to be adapted to various application requirements, and which is suitable for VLSI application.

. Further aims and advantages of the system according to the present invention will be discussed in the following description.

With this aim in view, according to the present invention, there is provided a system enabling high-speed convolution processing of image data, characterised by the fact that it comprises at least one arithmetical unit comprising a number of interconnected processing cells with at least partially common inputs and designed to perform one- or two-dimensional convolutions with separable variables, and memory means designed to memorise at least the said data to be subjected to such convolution processing.

BRIEF DESCRIPTION OF THE DRAWINGS

A number of embodiments of the present invention will now be described, by way of non-limiting examples, with reference to the attached drawings, in which:

FIG. 2a (a-c) shows a time graph of a number of signals in the

FIG. 2 diagram;

FIGS. 5a-5d, shows a number of operating control words supplied to the system according to the present invention;

DETAILED DESCRIPTION OF THE INVENTION

Figure 1:
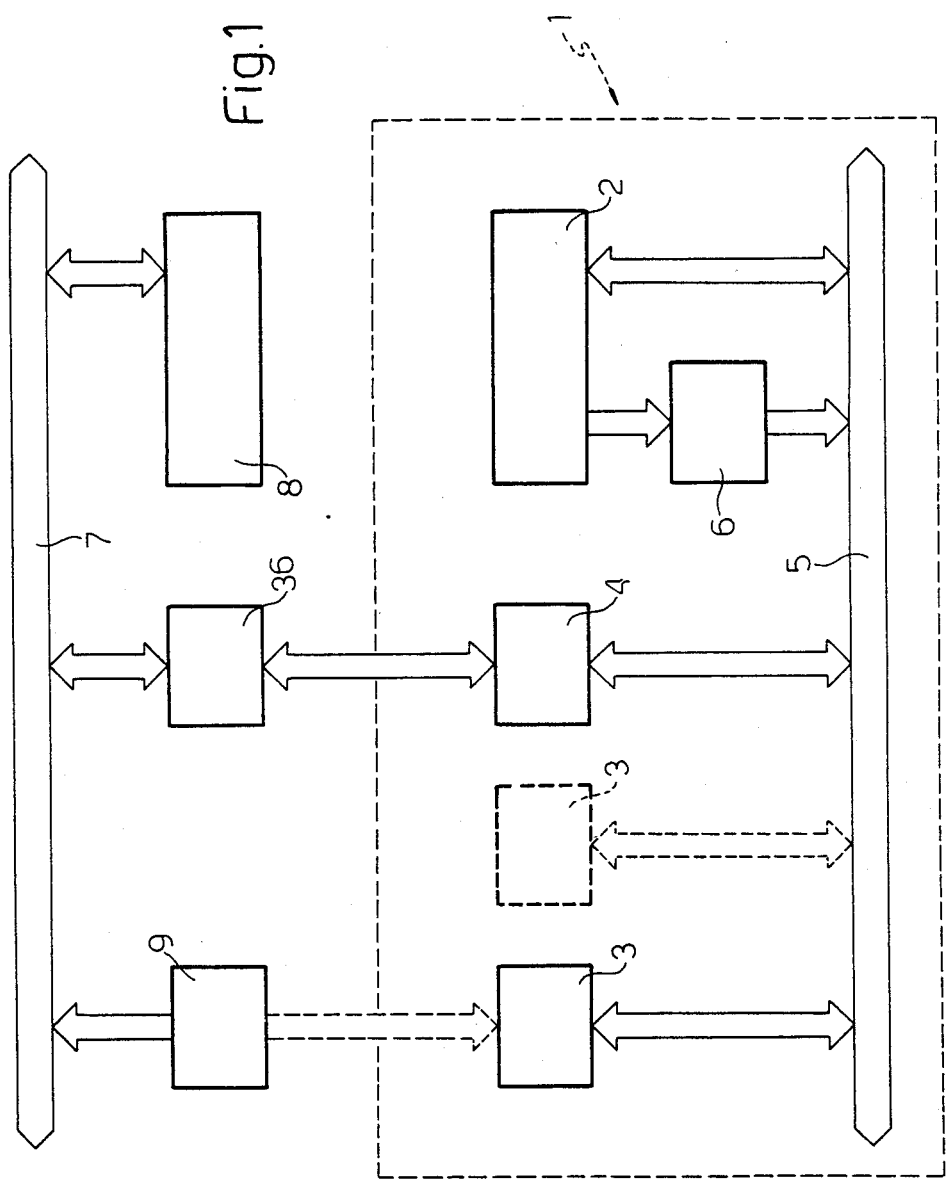
FIG. 1 shows a block diagram of a first embodiment of the system according to the present invention.

As shown in FIG. 1, the system according to the present invention, for convoluting numerical sequences, is enclosed inside block 1 (indicated by the dotted line and referred to as the convoluting block) and comprises an arithmetical unit 2, a memory block 3, and an interface and processing stage control block 4 which "governs operation of block 1 which is fully synchronous" and timed by an 8 MHz clock. Unit 2 and blocks 3 and 4 are two-way-data-connected over a local line 5, unit 2 also being one-way-connected to line 5 by means of a block 6 for approximating the end results and the functioning of which will be described in more detail later on. Interface block 4 is two-way-connected to a program control block 36, in turn, two-way-connected to a line 7 to which is connected a main computer 8, e.g. a VAX 11/780 manufactured by the Digital Equipment Corporation.

To the said line 7, there is also connected an external image sensor block 9, e.g. a telecamera.

Operation of convoluting block 1 consists in performing the coded instructions supplied in each individual case by computer 8. In other words, no fixed procedure exists, operation of the block being selectable as required by the operator.

A typical procedure, for processing a one-dimensional convolution, consists of the following stages:

(1) Transferring the sequence for processing (original image data) from computer 8 to block 1 (memory 3).

(2) Transferring the processing sequence and parameters from computer 8 to block 1 (local unit 2 memory).

(3) Processing via arithmetical unit 2, by withdrawing data from memory block 3, approximating the results to 8 bits, and reloading memory block 3.

(4) Transferring the resulting sequence (resulting image)
from block 1 to computer 8.

One-dimensional convolutions may be repeated (for two-dimensional convolutions) by repeating stages (2) and (3). Stages (3) and (4) may also be replaced by an alternative processing mode 3':

(3') Processing (of a one-dimensional convolution) while transferring results to computer 8.

All transfers to and from computer 8 and convoluting block 1 are performed in DMA with "handshake" logic. Each transfer is assigned an individual code, generated by computer 8, for enabling block 1 to identify which transfer is being performed, i.e. (1), (2), (3), (4) or (3'). The code accompanying transfer (1) causes block 1 to write the input data inside data memory block 3. For this transfer, a specific order exists in which to transmit the values of the sequence for processing, i.e. along each line from left to right (increasing column index) and line by line from top to bottom (increasing line index). Such an arrangement provides for easy reconstruction of the coordinates relative to each value received, which coordinates are employed by block 1 for forming a different address code as required for memory storage.

Transfer (2), identified by the code accompanying it, consists in transferring a few tens of words. The said words, which are memorised in appropriate registers (marked 14 in FIG. 2), define the calculation of a one-dimensional convolution using the data transmitted in stage (1). That is, together with the said words, block 1 is supplied with the processing sequence terms (8, 16, 24 or 32 values, 8 bits with a complement of (2) and a pair of "parameters" containing other necessary information, such as whether the convolution is a line or column convolution. A final code word in this transfer commences processing of the convolution according to the instructions received previously. In the specific case in question, processing consists in adding the products of the terms in the sequence for processing to the processing sequence terms, line by line or column by column. Each resulting sequence term is calculated with no intermediate approximation; the resulting (20-bit) value being approximated by an 8-bit number with a complement of 2.

At this processing stage (stage 3), block 1 is isolated from computer 8 for the processing time, and replaces the content of memory 3, initially consisting of the sequence for processing, with the sequence resulting from the convolution. The processing sequence terms and parameters are left unchanged and may be used or defined again for subsequent processing.

Transfer (4) is similar to that of stage (1) only in the opposite direction. This reading does not alter the content of data memory 3.

Convoluting block 1 is activated by a call from block 36, as part of a program performed by main computer 8. The said block 36 provides for performing the required coding and transfers.

In the FIG. 1 arrangement featuring a VAX 11/780 main computer 8, the resulting image is available for use in a few seconds. Such a substantial increase in total time as compared with processing time is almost entirely due to the time taken to transfer the image sequences between computer 8 and convoluting block 1. These times too, however, may be reduced to fractions of a second by optimizing the transfer procedures and employing faster interface blocks 36.

We shall now examine in more detail the operation of convoluting block 1 and arithmetical unit 2, for performing a basic one-dimensional digital convolution.

The calculation to be performed is the convolution of a sequence for processing X (of N.N terms) with a processing sequence consisting of h(-q), . . . , h(-1), h(0), h(1), . . . , h(p). These n terms (n=q+p+1=8, 16, 24 or 32) are indicated by "coefficients". The said calculation may be a line or column convolution, i.e.:

$$W = H_R * X \text{ or } W = H_c * X$$

The total calculation so indicated is performed term by term, i.e. the various values in the resulting sequence are calculated individually. (For simplicity, "datum" indicates a term in the sequence for processing X, and "result" a term in the resulting sequence W). The equation for the generic result w(l,m) is:

$$w(l,m) = \sum_{i=-q,p} h(i) \times (l, m - i)$$

or $$w(l,m) = \sum_{i=-q,p} h(i) \times (l - i, m)$$

The above equations indicate the operations required for calculating a result, i.e. adding the products of n data, each multiplied by an appropriate coefficient.

When it comes to performing the calculation, data is contained inside memory 3, whereas actual multiplication and addition are performed in arithmetical unit 2 in which the n coefficients have been memorised directly.

Once a result has been calculated, another is calculated by similarly adding the products of the same coefficients for a different group of n data. Furthermore, as shown in the aforementioned equations, once a coefficient sequence hs been set, the only difference between line and column convolutions lies in the group of n data.

As no given order exists in which to calculate the various results, a convenient systematic procedure consists in calculating results consecutively in straight lines: lines and columns for line and column convolutions respectively.

In the case of a line convolution, for example, calculating $w(l\cdot,m\cdot)$ requires reading n data $x(l\cdot,m\cdot-p), \ldots, x(l\cdot,m\cdot+q)$ from memory 3. Calculating $w(l\cdot,m\cdot+1)$ requires reading $x(l\cdot,m\cdot+1-p), \ldots, x(l\cdot,m\cdot+1+q)$. Of these, the first n-1 have already been read for previous calculations and only the last one is "new".

As each datum is employed for calculating n results which are calculated consecutively as the required data becomes known, each datum may be read only once from memory 3 and, for subsequent utilization, memorised directly in arithmetical unit 2. In the case stated above, such memorisation of previously read data applies only to the "latest" n-1, which provides for considerably simplifying data reading and the structure of arithmetical unit 2.

The same applies to a column convolution, in which case, data is read sequentially from memory 3 in columns, with no alterations being required to arithmetical unit 2.

In other words, convoluting a two-dimensional sequence X of N.N terms with a sequence of n h(i) terms is broken down into N separate convolutions of two one-dimensional sequence: the processing sequence and, each time, a different line (line or column) in the two-dimensional sequence, so as to obtain, each time, a corresponding line of results, sequence W elements, each of which may be indicated:

$$w(k) = \sum_{i=-q,p} h(i) \times (k - i).$$

This is a simplified equation, valid for both line and column convolutions, wherein terms w(k) and x(k-i), two-dimensional sequence elements, are taken to imply the (common) index identifying the straight line referred to in the calculation being performed.

Now let us consider the case of a convolution with a "causal" processing sequence of n terms (i.e. with coefficient indices ranging between q=0 and p=n-1):

$$w(k) = \sum_{i=0,n-1} h(i) \times (k - i)$$

Arithmetical unit 2, which is "programmed" to processing sequence (H), consecutively demands at the input the terms of sequence (X) for processing, and consecutively issues at the output the terms of processed sequence (W).

Figure 2:
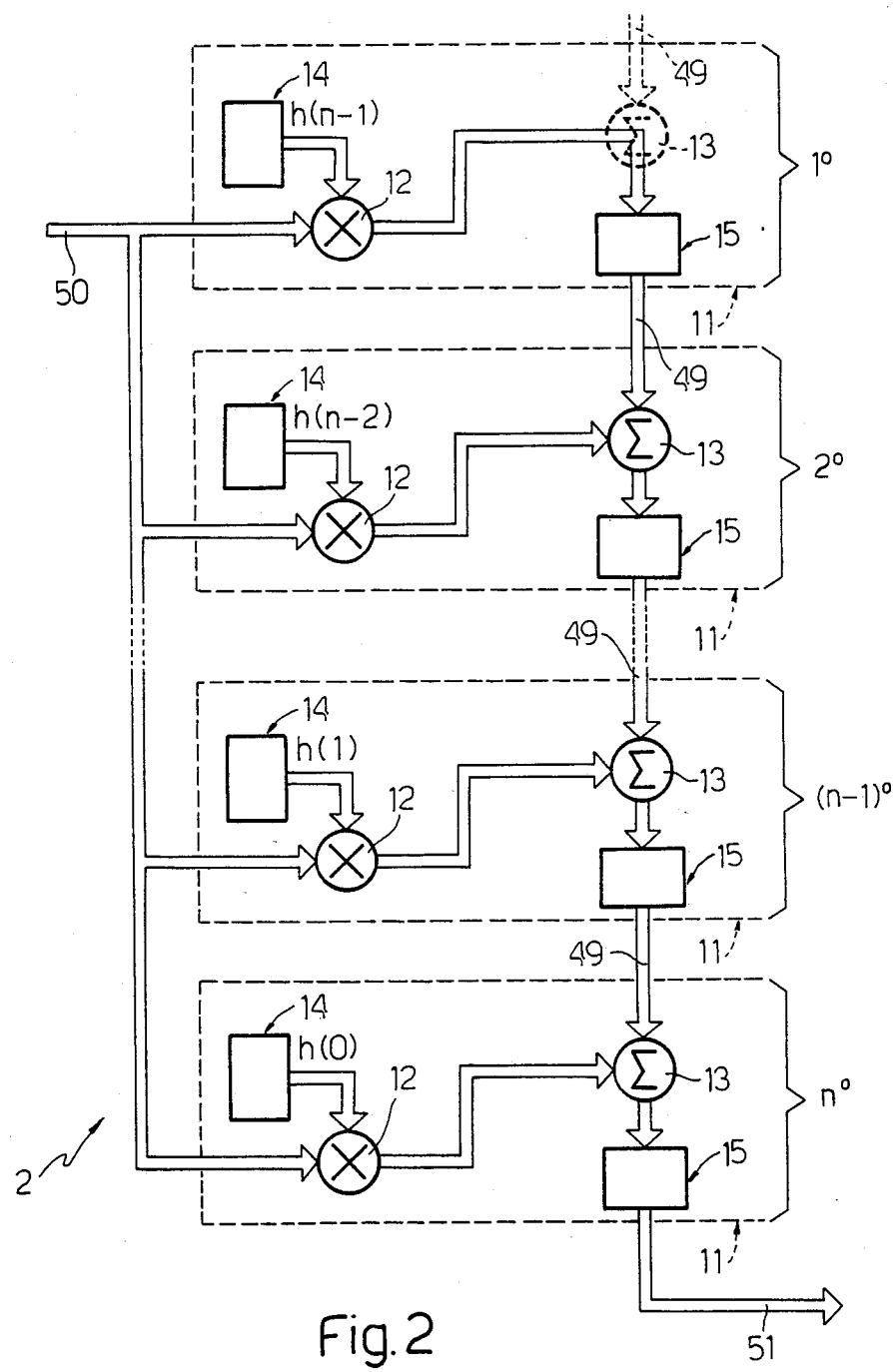
FIG. 2 shows a detailed block diagram of a first embodiment of an arithmetical unit in the FIG. 1 diagram.

In the embodiment shown in FIG. 2, the said arithmetical unit 2 therefore presents "n" number of identical stages 11 consisting of semisystolic cells, i.e. which operate synchronously with a common data input 50 and an output 49 for each stage 11 connected to an adding input of the next stage 11. Each of the said cells 11 comprises a high-speed 8×8 bit multiplier 12 for multiplying the datum from input 50 by the convolution coefficient h(i) supplied by a local RAM memory 14 loaded by computer 8. The output of multiplier 12 is supplied to a 20-bit adder 13 which adds it to the datum present at output 49 of the foregoing stage 11. The output of adder 13 is supplied to a register 15 the output of which constitutes the output 49 of stage 11.

Figure 2A:
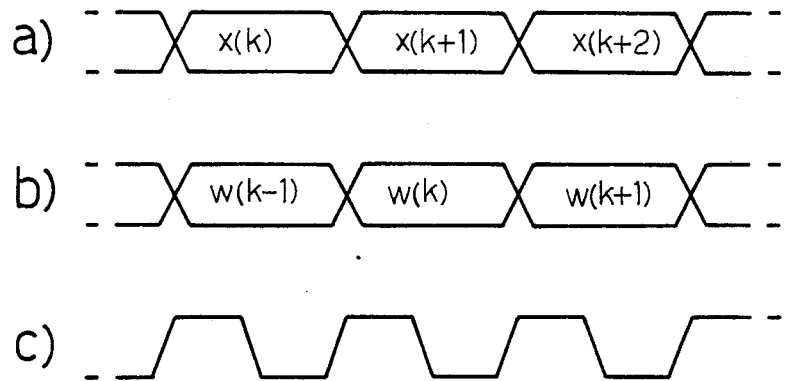

Whereas both multipliers 12 and adders 13 consist of combination logic blocks, the output of which depends on the input data, operation of each register 15 requires a write control signal. At each rising edge of the write control signal, each register memorises the datum at its input at that particular time, transfers it to the output and keeps it stable (regardless of any changes at the input) until the next rising edge is received. The said signal, consisting of timing signal (c) in FIG. 2a, is understood as being for registers 15 in the FIG. 2 diagram. Also in FIG. 2a, (a) represents a time graph of the value at input 50 of unit 2 in FIG. 2, and (b) a time graph of the values at output 51.

Each of the data sent consecutively to input 50 of arithmetical unit 2 remains constant for one cycle (the period between two consecutive rising edges of the time signal) so as to enable calculation of a new result, which is sent to output 51 of unit 2 in the following cycle. Result formation is easily deducible in view of the repetitive nature of the structure (the first cell 11 in FIG. 2 may, for the sake of uniformity, present an adder 13 having one of inputs (49) set to zero).

In the case of n coefficients, each term is calculated by n stages (FIG. 2) in n cycles. Calculating:

$$w(k) = h(n-1) \times (k - n + 1) + h(n + 2) \times$$
$$(k - n + 2) + \ldots + h(1) \times (k - 1) + h(0) \times (k)$$

commences in the first stage 11 in the cycle wherein $x(k-n+1)$ with a product $h(n-1)$ $x(k-n+1)$ $x(k-n+1), \ldots$ is present at the input of multiplier 12.

Cycle by cycle, a sum is formed by stages 11 adding one term each time to the partial result at the output of register 15 of the foregoing stage 11, until, in the cycle wherein x(k) is present at the input of multipliers 12, the last stage 11 adds the last addendum, h(0) x(k), and sends the complete result w(k) to output 51 of arithmetical unit 2 in the next cycle.

A specific feature of the FIG. 2 structure is that the operations performed consecutively in each cycle are a multiplication and an addition. This two-operation sequence is independent of the number of stages, i.e. no further consecutive operations are required regardless of how many stages n are involved.

This is an important feature in that the time taken to perform the consecutive operations in each cycle (due to component delay) is what determines the minimum timing period for operating the convoluting block, which time must, obviously, be minimised as far as possible.

Taking into account output register 15 of the last stage 11, the actual sequence available at output 51 of unit 2 in FIG. 2 is delayed one cycle in relation to sequence X at input 50 (as shown by graphs (a) and (b) in FIG. 2a). Output register 15, in fact, is a "pipeline" register, i.e. unlike the others, it is not required by the process, but is employed for separating, in subsequent cycles, the operations performed in the last stage 11 of unit 2 from those performed by the downstream block.

Pipeline registers are practically a must between blocks, but they may also be used inside the block itself. For example, for unit 2 in FIG. 2, a pipeline level consisting of an additional register may be inserted in each stage 11 between multiplier 12 and adder 13. In this case, the lower timing period limit is determined by the longest delay time of a multiplier 12 and an adder 13, with the result that the output sequence is delayed two cycles in relation to input sequence X.

In a preferred embodiment, arithmetical unit 2 in FIG. 2 consists of a module having eight stages 11, which means it can calculate convolutions involving processing sequences of n≦8 terms.

Figure 4:
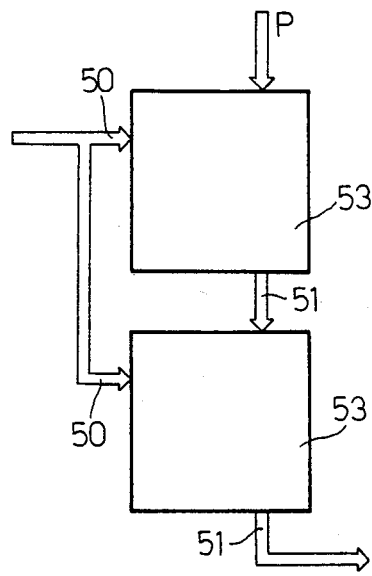
FIG. 4 shows an overall block diagram of the arithmetical unit in the FIG. 1 diagram.

In cases involving more than eight coefficients, a first processing mode provides for cascade-connecting a number of identical modules (by virtue of the repetitive nature of the FIG. 2 structure). In the case of n≦16, for example, two modules (numbered 53) are required, connected as shown in FIG. 4 wherein: input 50 is the input common to the eight multipliers 12 of each module 53; P is the input of adder 13 in the first stage 11; and 51 is the output of register 15 in the eighth stage 11.

As the number of coefficients increases, the number of stages 11 required by unit 2 also increases, whereas processing time remains unchanged.

Given a timing period of 125 nSec and a sequence for processing of 256K terms, a processing operation (requiring approximately as many cycles as the terms in the sequence for processing) is performed in roughly 35 mSec.

Figure 3:
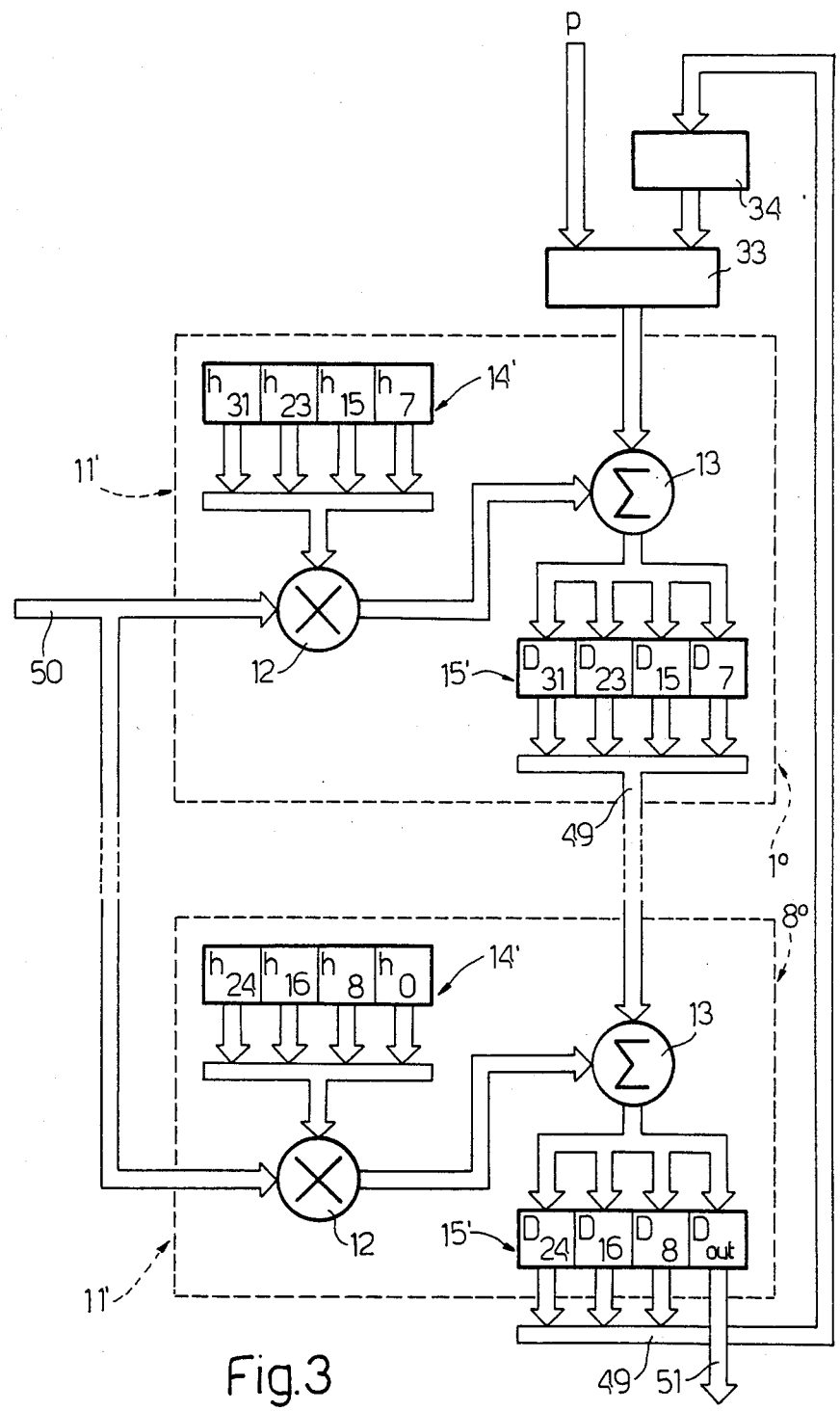
FIG. 3 shows a detailed block diagram of a second embodiment of the arithmetical unit in the FIG. 1 diagram.

Leaving aside the foregoing solution for when such processing speed is required, the present invention also takes into account the possibility of processing convolutions involving more than eight coefficients (with a proportional increase in processing time, of course) employing the multipliers 12 and adders 13 of one module 53. The structure of unit 2, including the repeat components, is shown in FIG. 3, which only shows the first and last stage 11' in the eight-stage chain which, every cycles ( =1, 2, 3, 4), calculates a result of a convolution with a processing sequence of .8 coefficients.

Each stage 11' presents a multiplier 12 which receives datum 50 at one input and, at the other input, a coefficient selected from a group, in this case, of four coefficients memorised in a RAM memory group 14'. The output of multiplier 12 is sent to adder 13 which receives at the other input, from the foregoing stage 11', the output of one of a group 15' of four registers and, in turn, sends the output to its own group 15' downstream. One input of adder 13 of first stage 11' is connected to the output of a scanner (switch) 33 which, at one input, receives signal p, and, at the other inputs, the output of an additional register 34 the input of which receives the output of one of registers $D_{24}$, $D_{16}$, $D_8$) in group 15' of eighth stage 11', with the exception of register ($D_{out}$) in group 15' which supplies output 51. The said switch 33 provides for repeat processing (as many as four in this case) for processing convolutions with sequences of 8, 16, 24 or 32 terms. As explained in more detail later on, this enables the processing of convolutions having sequences in excess of the number of stages 11' on arithmetical unit 2, by processing the convolution sequentially, with a proportional increase, of course, in the processing time involved.

Operation of unit 2 in FIG. 3 will be described assuming 32 coefficients. As in the 32-stage structure in FIG. 2, the FIG. 3 structure presents 31 registers containing partial sums ($D_{31}$, ..., $D_1$) and one ($D_{out}$) containing the end result. The content of each of the said registers is altered by each new input datum: in the FIG. 2 structure, this is performed in one timing period, whereas, in the FIG. 3 structure, four consecutive periods (referred to as "steps" and which constitute one "cycle") are required, at the end of which four periods, a new result is entered into the $D_{out}$ register.

Step operation is performed by enabling "in columns" both memory groups 14' and four-register groups 15'. In the first step of each cycle, multipliers 12 are supplied with coefficients h(31), ..., h(24), registers $D_{31}$, ..., $D_{24}$ are enabled, and switch 33 is set so as to supply input P to the first adder 13. (The said input P is required for cascade-connecting a number of modules 53. With a single module 53, as in this case, input P may be assumed to be zeroed. Input P, in fact, is also used for approximating the results, as described in more detail later on). At the end of this first step, new values are entered into registers $D_{31}$, ..., $D_{24}$. And similarly for the other "columns" (23, ..., 16; 15, ..., 8; 7, ..., 0) in the following steps. In the said following steps, the setting of switch 33 is changed so as to supply the first adder 13 with the output of register 34 on the feedback connection from the registers in the last stage 11'. The said register 34 carries forward the value contained in the register of the last stage enabled in the foregoing step.

A 24-coefficient sequence is obviously calculated in only three steps: the first, wherein switch 33 selects input P, enables column 23, ..., 16; the second enables column 15, ..., 8; and the third and last (after which register $D_{out}$ is loaded) enables column 7, ..., 0.

Two steps suffice for 16 coefficients, whereas 8 require no repeat processing.

Arithmetical unit 2, composed of four repeat steps, operates, in relation to the up- and downstream stages, in the same way as a standard arithmetical unit (with no recycling) composed of 8 stages with an (apparent) operating cycle of timing periods. This means, for example, that two of the said units 2 may be cascade-connected, as shown in FIG. 4, each recycling independently, for processing convolutions having sequences of 32 coefficients in only two steps.

For maximising the resolving capacity of arithmetical unit 2, no approximation is made of multiplications or additions.

In the case of multiplications, the product of two 8-bit factors with a complement of 2 is given in 15 bits (to obtain two sign bits, the case of both factors being −128, i.e. binary 10000000, is excluded).

In the case of additions, which involve adding up to a maximum of 32 products, intermediate 20-bit results are issued to prevent overflowing even in the worst possible case.

For general applications of unit 2, exact intermediate calculations are recommended. In the case of a convolution result, however, a 20-bit result would obviously be unemployable, which is why provision has been made for programmable approximating block 6.

As unit 2 and memory 3 are designed to operate with 8-bit data, a two-dimensional convolution requires intermediate approximation of the results of the first one-dimensional convolution.

Approximating block 6, which consists exclusively of combination logic, selects a group of 8 bits, in any position, from the 20-bit word from unit 2.

The value of the m least significant bits below the 8 selected bits (m is programmable as described in more detail later on) is rounded off to initiate the addition performed in unit 2, i.e. assuming "p" to be the 20-bit word: 00 ... 010 ... 00, wherein the only bit equal to 1 is in the m-ma position, counting from the least significant bit. Furthermore, if the number represented by the remaining 20-m most significant bits cannot be represented in 8 bits (i.e. if the 13-m most significant bits are not all the same), the output of approximating block 6 issues, not the 3 selected bits, but the maximum value representable in 8 bits, together with the sign of the initial number (+127 if positive, −128 if negative). In other words, so-called saturation logic is employed.

The present invention also provides for approximating one-dimensional convolution results to 16 instead of 8 bits. This is achieved by transferring each result directly to computer 8 (by "slowing down" the speed of unit 2 to comply with transfer speed). In this case, the limit consists of the length of the word transferred between convoluting block 1 and block 36. With this procedure, the content of memory 3 remains unchanged.

At this point, the two parameters transmitted by computer 8 to convoluting block 1 may be defined exactly. The first parameter, relative to the coefficients, indicates value q (number of non-causal terms in the processing sequence; $0 \leq q \leq 31$ requires 5 bits) and the number of coefficients in the processing sequence (via a 2-bit code).

The second (processing) parameter indicates whether a line or column convolution is required (1-bit code) and defines value m (for programming approximating stage 6; $0 \leq m \leq 12$ requires 4 bits; the circuit extends the sign in the case of m=13, 14, 15). This parameter also contains a last significant bit for selecting the processing sequence, in that the coefficients of two independent sequences (to each of which corresponds a parameter of the first type) may be memorised simultaneously in unit 2.

Figure 5:
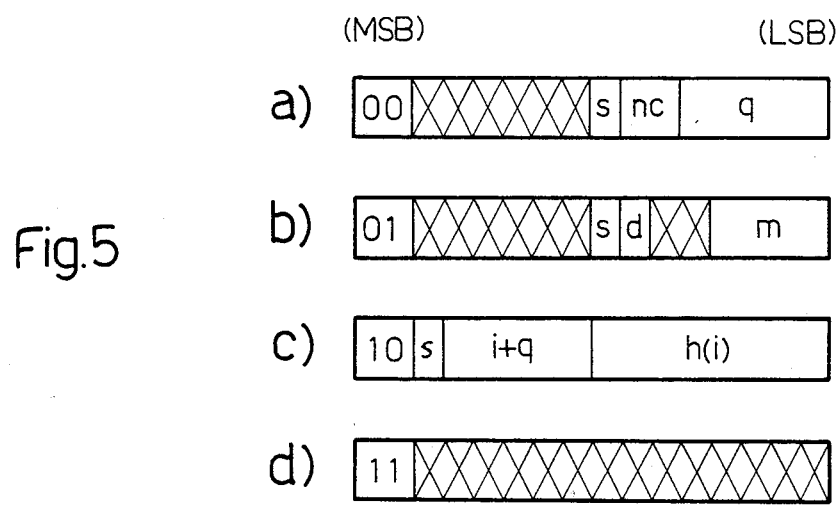
FIG. 5 companying

In this transfer, convoluting block 1 also receives the terms of the processing sequence/s, which are entered in respective positions in memory 14 of unit 2 (FIG. 3 shows the positions for one sequence only). For this purpose, each coefficient is transferred together with an index of i+q ($0 \leq i+q \leq n-1 \leq 31$ therefore requires 5 bits) and a bit indicating which processing sequence it belongs to. The transferred words are as shown in FIG. 5 wherein (a), (b), (c) and (d) indicate respectively the words relative to: the coefficient parameter, processing parameter, coefficient and processing start, and wherein, in addition to the aforementioned symbols:

| | | |
|---|---|---|
| s | = | 0 or = 1 indicates the coefficient sequence. |
| nc | = | 00 for an 8-coefficient sequence, |
| | = | 01 for 16, = 10 for 24, = 11 for 32. |
| d | = | 0 for a line convolution, |
| | = | 1 for a column convolution. |

As different words are identified by the two most significant bit code, parameters and coefficients may be transferred in any order. Finally, one transfer may contain a number of one-dimensional convolution processing start controls, for programming the processing of a separable two-dimensional convolution.

Memory block 3 may contain an entire image sequence (e.g. 512.512 8-bit data) and is "loaded" by computer 8 with the sequence for processing.

During processing by unit 2, the data for processing must be read sequentially in lines, cycle by cycle, from memory 3, and the results (approximated to 8 bits) entered in the same way.

Using only one memory 3 having a total capacity equal to the number of terms in one sequence, results are memorised at the expense of the initial data (unless a number of memory 3 modules are provided as shown by the dotted lines in FIG. 1).

This, however, in no way interferes with processing in that each datum is read only once, and the result to be entered in a given position is only available after the datum contained in the said position has already been read. The only problem involved, therefore, is not so much utilization of the memory positions as the speed required, in that, for each cycle, memory 3 is called upon to perform one read and one write operation.

Figure 6:
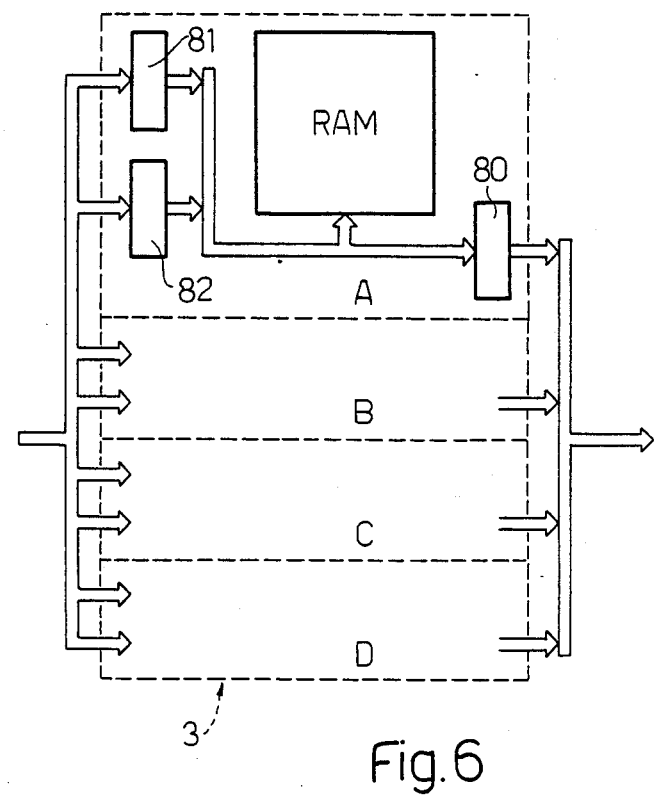
FIG. 6 shows a detailed block diagram of one embodiment of the memory means in the FIG. 1 diagram.

As the said data must be written or read according to a known sequence (in this particular case, sequentially in lines or columns), special memory arrangements enable data to be exchanged at greater speed than that allowed by only one memory. As shown in FIG. 6, memory block 3 is composed of four identical banks A, B, C and D, each consisting of:

a 64K byte RAM;
a register 80 for temporarily memorising each datum read in that particular bank;
a pair of registers 81 and 82 activated alternately for temporarily memorising each datum to be written in that particular bank.

Provision is also made for known control circuits (not shown) common to all four banks.

A memory bank is characterised by capacity and access time. The capacity of each of the said four banks is 64K bytes, which value depends on the number of single RAM devices (8 eight-bit K words) employed.

Access time (150–200 nSec) is the time taken to perform a read operation (for making a given datum available) or a write operation (for memorising a given datum).

As the arrangement in question does not allow for performing a read or write operation within one time period (125 nSec), each operation is performed in two consecutive periods (i.e. 250 nSec). By virtue of the parallel operating mode of the four banks, however, the equivalent access time works out at four times less.

With the aid of the registers, therefore, memory 3 as a whole is capable of reading and writing one datum per cycle, as required by arithmetical unit 2 operating at maximum speed.

The processed data are two-dimensional sequence terms which, as such, are indicated by a pair of coordinates. Each datum is memorised together with an address code, each sequence having its own unique coordinate-address combination. During processing, in fact, result w(1,m) is written in the same position in which x(1,m) was memorised.

Given a single 256K memory bank, for example, the datum indicated by coordinates (i,j) may be taken as being memorised in the position indicated by address code:

$$a_0(i,j) = (i.512) + j$$

As $0 \leq i,j \leq 511$, this gives $0 \leq a_0(i,j) \leq (256.1024) - 1$. When dealing with four 64K banks, however, each datum must also be assigned to a given memory, so that consecutive data in lines or columns, which are read or written simultaneously, are in different banks.

The datum indicated by coordinates (i,j) is written in bank A, B, C or D according to whether:

$$(i+j)_{mod.4} = 0, 1, 2 \text{ or } 3.$$

The said datum is therefore assigned address code:

$$a(i,j) = (i.128) + (j/4)$$

wherein $0 \leq i,j \leq 511$ with $0 \leq a(i,j) \leq (64.1024) - 1$ and the remainder of a whole number division is neglected.

Each of input registers 81 and 82 of each bank is thus allowed access to local line 5 every four cycles for a write operation. The same applies to output register 80 by virtue of the control logic again imposing cyclic access to the video data (memory reading). In this case, data is read in lines or columns, depending on the program selected by the operator.

We shall now examine in detail the processing of a line of data with reference to the operation of memory block 3, and assuming unit 2 performs one processing operation per timing period, i.e. one processing operation with an 8-coefficient sequence and one module, or a multiple-length sequence with more than one module (FIG. 4).

Inside memory 3, the RAMs perform alternate read and write operations. We shall commence by examining the read operations, i.e. the output data.

Completion of a read operation by the RAMs is marked by the rising edge of the write control signal of output registers 80. Subsequent to being read, four data, one for each bank, are written in the respective output register 80 of each bank. The said data are then supplied sequentially to the output of memory 3 over the next four timing periods, thus enabling, one at a time, the outputs of registers 80.

The next data reading is performed by the RAMs two timing cycles later. Consequently, at the end of the fourth cycle subsequent to a reading operation, in which cycle the data written in output registers 80 is employed, the data to be supplied to the output of memory 3 in the next four cycles is again written inside registers 80. In other words, therefore, between two consecutive read operations, two timing periods are left available to the RAMs for writing four results.

To continue with our first-line-processing example, wherein only the column index $0 \leq K \leq 127$ is indicated, if we assume, for the time being, only one input register per bank, the first datum w(4K) will be written in the bank A register, and data w(4K+1), w(4K+2), w(4K+3), received in the following cycles, will be written in the respective registers of banks B, C and D. At this point, the said values could be written simultaneously by the RAMs, providing the said values are made available in the period between two read operations, which is not always the case. What is more, the said four data are only simultaneously stable for one timing period, in that, after w(4K+3), the last in the group of four data, has been written in the bank D register, w(4K+4) is received, which must be written in the bank A register in place of w(4K). This fact alone, however, would not impair the writing operation, by virtue of the RAM design.

The values of a write operation, which must necessarily be performed between two read operations, should therefore always present consecutive, though not strictly group-related, coordinates, a feature which would require more complex control logic for generating the addresses of the four RAM banks.

The solution adopted in the present case, on the other hand, consists in doubling the input registers (81 and 82), which, in addition to simplifying design, also provides for "high-speed acquisition".

By doubling registers 81 and 82, the values supplied to the input of memory 3 (still with reference to the first line) need simply be written consecutively in registers: 82 of bank A, 82 of bank B, 82 of bank C, 82 of bank D, 81 of bank A, 81 of bank B, 81 of bank C, 81 of bank D, and so on commencing again from the first. Thus, in the interval between two read operations, registers 82 or 81 (alternately) of the four banks contain a group of four values which, in addition to remaining stable throughout the write operation (thus facilitating performance of the same), is compatible with the RAM block read addressing system.

To conclude, it should be pointed out that, for reading and/or writing data in a generic line (column) i, the four registers in each group (four output registers 80, four registers 81, and four input registers 82) are used in the following order:

$$A, B, C, D \text{ if } (i)_{mod.4} = 0$$
$$B, C, D, A \text{ if } (i)_{mod.4} = 1$$
$$C, D, A, B \text{ if } (i)_{mod.4} = 2$$
$$D, A, B, C \text{ if } (i)_{mod.4} = 3$$

As with arithmetical unit 2, a number of identical memory blocks 3 may be interconnected (this time "parallel") for memorising the results of a convolution without losing the starting data. Given two memory blocks 3, for example, during processing, these would alternately perform the read and write operations described previously relative to one memory block 3, in which case, only one control logic would be required for generating the addresses and controls.

For processing requiring no repetition in arithmetical unit 2, memory 3 performs one read and one write operation for each position in a total of 35 mSec. As already stated, this is only possible for operations involving consecutive data in lines or columns. The order in which data is read for a line convolution, however, is the same as for transferring the said data to the computer and, in this case, no writing is required. The same applies when transferring data in the opposite direction, in which case, memory 3 is only called upon to perform write operations.

Finally, some mention should be made of the structure of memory 3, in particular, registers 80, 81 and 82.

Within each memory bank, operation of the RAMs and registers is synchronized by means of partially separate control logics, in that the RAMs perform one operation in two cycles, unlike registers 80, 81 and 82, which perform one operation per cycle.

Such separation may be exploited for potentially enabling the RAMs and registers to perform sequential read- or write-only operations at a speed of 4 read or 4 write operations every 250 nsec.

In the case of read operations, the RAMs would perform consecutive read-only operations, the data being written as usual in output registers 80 at the end of each operation. The said output registers 80, in this case controlled with 16 MHz timing, would issue one datum every 62.5 nsec, which would therefore be the equivalent access time of memory 3.

Similarly, the write operation would provide for acquiring the image signal directly from telecamera 9, as shown by the dotted line in FIG. 1, wherein convoluting block 1 may be limited solely to unit 2, approximating circuit 6, memory block 3 and control circuit 4. A standard television picture, in fact, is composed of about 600 lines with a 4/3 width/height ratio. As the analogue signal of each line is transmitted in 52 μsec, for maintaining the same sampling cycle for both lines and columns, the said signal must be sampled 800 times, i.e. every 65 nsec. For memorising data at this rate, operation of the RAMs requires the use of double input registers.

Using double input registers (and entering data in cycles as usual), while one set of registers (e.g. input registers 81) is supplying the RAM with a stable group of 4 data for memorising, the other (input registers 82)

is temporarily loaded with the incoming data to be supplied to the RAMs in the next operation.

The advantages of convoluting block 1 according to the present invention will be clear from the foregoing description. In particular, it is fully versatile, both in terms of improved circuitry for arithmetical unit 2 for meeting the requirements of real-time operating systems, as well as in terms of programming for extending application scope.

Furthemore, block 1 provides for straightforward operation with macroinstructions relative to filter size, coefficients, end result format, and the sequence of the two one-dimensional convolutions required for processing two-dimensional convolutions.

With certan limitations, various sequential one-dimensional convolutions may be performed in repeat mode, to obtain equivalent size filters of even more than 32 coefficients. The precision of block 1 according to the present invention is therefore suitable for more general image pick-up and processing applications.

The possibility of recirculating partial results considerably improves the versatility of arithmetical unit 2. In fact, various configurations may be selected between the two extremes wherein N modules are cascade-connected for obtaining the 8N coefficients in a high-speed convolution, or a single module is employed for a convoluting block N times slower.

The uniform, repetitive design of the structure of unit 2, formed using various identical stages 11, is an important characteristic enabling it to be implemented in VLSI integrated mode.

In fact, the formation of a high-cost VLSI circuit may only be of advantage if it can be converted into an "elementary" module employable on differing parallel structures.

The formation of a system comprising only convoluting block 1, with direct data access from telecamera 9, provides for even more versatile application by enabling telecamera 9 to be disconnected from main computer 8. To those skilled in the art it will be clear that changes may be made to the embodiment of the system as described herein without, however, departing from the scope of the present invention.

We claim:

1. A system (1) enabling high-speed convolution processing of image data, comprising at least one arithmetical unit (2) comprising a number of interconnected processing cells (11, 11') with at least partially common inputs (50) and which perform one- or two-dimensional convolutions with separable variables, and memory means (3) for memorising at least said data to be subjected to such convolution processing; wherein said processing cells (11, 11') are substantially identical and each comprises a multiplier (12) which is supplied to an adder (13) which is also supplied with said data for processing and with the coefficients of said processing operation, and the result of which is supplied with the output of a foregoing cell (11, 11'); the output of said adder (13) being supplied to a memory register (15, 15') the output (49) of which constitutes the output of the cell; and wherein said arithmetical unit (2) comprises a number of said cells (11') each comprising a second number of memory means (14') for the coefficients of said processing operation and registers (15') for memorising the output of the respective adder (13), said memory means (14') and said registers (15') being enabled "in columns" at each processing step, and comprising a scanner (33) which selectively connects to the input of the adder (13) of the first cell (11') an external input (p) or the outputs of the registers (15') of the last downstream cell (11'), in such a manner as to enable repeat processing with a number of steps equal to said second number and wherein, at each step, there is carried over to said scanner (33) the output of the register (15') of the last cell (11') enabled in the foregoing step.

2. A system as claimed in claim 1, further comprising means (14, 14') for memorising the coefficients of said processing operation.

3. A system as claimed in claim 1, wherein said memory means (3) comprise a number of memory banks (A, B, C, D) interconnected in parallel mode.

4. A system as claimed in claim 3, wherein each of said banks (A, B, C, D) comprises a RAM memory, a first register (80) for temporarily memorising each datum read in said memory, and at least one second register (81, 82) for temporarily memorising each datum to be entered into said memory.

5. A system as claimed in claim 4, wherein each of said banks (A, B, C, D) comprises two of said second registers (81, 82) activated alternately.

6. A system as claimed in claim 1, wherein the results obtained from said arithmetical unit (2) are memorised in said memory means (3) in place of said initial data for processing.

7. A system as claimed in claim 1, further comprising means (6) for approximating the end results from said arithmetical unit (2).

8. A system as claimed in claim 7, wherein said approximating means (6) consist of combination logic elements and select, from a word obtained from said unit, a more select group of bits in any position.

9. A system as claimed in claim 1, further comprising means (4) for controlling the processing stages of said system (1) and for interfacing an external computer (8).

10. A system as claimed in claim 1, wherein said convolution processing operations are for the purpose of "extracting edges" from said images.

11. A system as claimed in claim 1, wherein said data is obtained by means of environment viewing devices.

12. A system as claimed in claim 11, wherein said devices comprise a telecamera (9).

13. A system as claimed in claim 12 wherein said data from the said telecamera (9) is sent directly to said memory means (3).

14. A system as claimed in claim 1, wherein said image data is picked up by a computer (8) off said system (1).

* * * * *